(12) United States Patent
Ehgartner et al.

(10) Patent No.: US 11,662,064 B2
(45) Date of Patent: May 30, 2023

(54) PRESSURE VESSEL SYSTEM FOR A VEHICLE

(71) Applicant: Bayerische Motoren Werke Aktiengesellschaft, Munich (DE)

(72) Inventors: Lorenz Ehgartner, Ebersberg (DE); Timo Gutmann, Bad Kohlgrub (DE); Leander Koegl, Vagen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 252 days.

(21) Appl. No.: 16/696,694

(22) Filed: Nov. 26, 2019

(65) Prior Publication Data

US 2020/0096158 A1    Mar. 26, 2020

Related U.S. Application Data

(63) Continuation of application No. PCT/EP2018/062863, filed on May 17, 2018.

(30) Foreign Application Priority Data

May 29, 2017    (DE) ...................... 10 2017 209 000.6

(51) Int. Cl.
*F17C 7/00* (2006.01)
*F17C 13/12* (2006.01)
*F17C 13/04* (2006.01)

(52) U.S. Cl.
CPC .............. *F17C 13/123* (2013.01); *F17C 7/00* (2013.01); *F17C 13/04* (2013.01);
(Continued)

(58) Field of Classification Search
CPC .......... F17C 13/123; F17C 7/00; F17C 13/04; F17C 2205/0326; F17C 2205/0332;
(Continued)

(56) References Cited

U.S. PATENT DOCUMENTS 3,159,506 A * 12/1964 Salathe ................... H01M 8/06
429/416
4,227,497 A * 10/1980 Mathieson ............. F02M 13/08
123/525
(Continued)

FOREIGN PATENT DOCUMENTS

DE    10 2009 029 258 A1    3/2011
DE    10 2011 111 610 A1    3/2012
(Continued)

OTHER PUBLICATIONS

PCT/EP2018/062863, International Search Report dated Sep. 21, 2018 (Two (2) pages).
(Continued)

*Primary Examiner* — Matthew W Jellett
(74) *Attorney, Agent, or Firm* — Crowell & Moring LLP

(57) ABSTRACT

A pressure vessel system for a vehicle includes a pressure vessel and a fuel line. The system also includes a blocking unit which, in an inoperative state, prevents fuel from passing out of the pressure vessel into the fuel line. A control unit for the blocking unit is designed, under the action of electrical energy, to transfer the blocking unit from the inoperative state into an active state in which fuel can pass out of the pressure vessel into the fuel line. Furthermore, the system includes an electrically conducting connection to an electrical system of the vehicle via which electrical energy can be provided for controlling the blocking unit. In addition, the system includes an access interface unit via which electrical energy for controlling the blocking unit can be provided from an external energy supply if no electrical energy is available from the electrical system of the vehicle.

13 Claims, 2 Drawing Sheets

(52) U.S. Cl.
CPC .................. *F17C 2201/056* (2013.01); *F17C 2205/0142* (2013.01); *F17C 2205/0326* (2013.01); *F17C 2205/0332* (2013.01); *F17C 2205/0338* (2013.01); *F17C 2205/0394* (2013.01); *F17C 2221/012* (2013.01); *F17C 2221/033* (2013.01); *F17C 2223/0123* (2013.01); *F17C 2223/036* (2013.01); *F17C 2250/03* (2013.01); *F17C 2260/042* (2013.01); *F17C 2265/04* (2013.01); *F17C 2265/066* (2013.01); *F17C 2270/0168* (2013.01); *F17C 2270/0184* (2013.01)

(58) Field of Classification Search
CPC ...... F17C 2205/0338; F17C 2205/0394; F17C 2221/012; F17C 2221/033; F17C 2250/03; F17C 2260/042; F17C 2265/04; F17C 2270/0168; F17C 2205/0329; F17C 2205/0335; F17C 2225/0123; F17C 2225/033; Y02E 60/32; Y02T 90/40
USPC ............................................ 701/36; 132/255
See application file for complete search history.

(56) References Cited

U.S. PATENT DOCUMENTS

| | | | | |
|---|---|---|---|---|
| 7,927,754 | B2* | 4/2011 | Harris | H01M 8/02 |
| | | | | 429/457 |
| 8,523,105 | B2* | 9/2013 | Buchheit | H01M 8/04208 |
| | | | | 244/119 |
| 8,561,453 | B2* | 10/2013 | Hobmeyr | F17C 13/025 |
| | | | | 73/1.66 |
| 2007/0012362 | A1* | 1/2007 | Thyroff | F17C 5/06 |
| | | | | 137/255 |
| 2007/0298313 | A1* | 12/2007 | Iida | F17C 5/06 |
| | | | | 429/49 |
| 2008/0035235 | A1* | 2/2008 | Kobayashi | F17C 7/00 |
| | | | | 141/94 |
| 2008/0077286 | A1* | 3/2008 | Oyobe | B60L 1/00 |
| | | | | 903/902 |
| 2009/0277515 | A1* | 11/2009 | Pechtold | F16K 31/003 |
| | | | | 137/468 |
| 2009/0283351 | A1* | 11/2009 | Cannet | F17C 13/084 |
| | | | | 180/302 |
| 2011/0272048 | A1* | 11/2011 | Glaeser | F17C 5/06 |
| | | | | 137/613 |
| 2012/0031525 | A1* | 2/2012 | Wonders | F17C 5/002 |
| | | | | 141/94 |
| 2012/0175366 | A1* | 7/2012 | Schulze | F17C 13/04 |
| | | | | 220/89.1 |
| 2013/0032221 | A1* | 2/2013 | Breuer | F16K 17/38 |
| | | | | 137/72 |
| 2013/0169226 | A1* | 7/2013 | Read | B60L 58/30 |
| | | | | 320/109 |
| 2014/0166121 | A1* | 6/2014 | Jung | H01M 8/04089 |
| | | | | 137/154 |
| 2014/0209179 | A1* | 7/2014 | Maier | H01M 8/04686 |
| | | | | 137/12 |
| 2015/0330116 | A1* | 11/2015 | Dente | B60L 58/15 |
| | | | | 307/10.1 |
| 2018/0112827 | A1* | 4/2018 | Jacobsen | F17C 13/02 |
| 2018/0138528 | A1* | 5/2018 | Komiya | H01M 8/04753 |

FOREIGN PATENT DOCUMENTS

| | | |
|---|---|---|
| DE | 10 2014 205 712 A1 | 10/2015 |
| DE | 10 2015 218 233 A1 | 3/2017 |
| DE | 10 2015 218 235 A1 | 3/2017 |
| DE | 10 2015 218 986 A1 | 3/2017 |
| WO | WO 2004/014683 A1 | 2/2004 |

OTHER PUBLICATIONS

German Search Report issued in German counterpart application No. 10 2017 209 000.6 dated Mar. 14, 2018, with Statement of Relevancy (Nine (9) pages).

* cited by examiner

PRESSURE VESSEL SYSTEM FOR A VEHICLE

CROSS REFERENCE TO RELATED APPLICATIONS

This application is a continuation of PCT International Application No. PCT/EP2018/062863, filed May 17, 2018, which claims priority under 35 U.S.C. § 119 from German Patent Application No. 10 2017 209 000.6, filed May 29, 2017, the entire disclosures of which are herein expressly incorporated by reference.

BACKGROUND AND SUMMARY OF THE INVENTION

The invention relates to a pressure vessel system for a vehicle, with one or more pressure vessels for receiving a fuel.

A road motor vehicle may have a fuel cell that generates electrical energy for operation, in particular for propulsion, on the basis of a fuel such as hydrogen. The fuel can be stored in one or more pressure vessels or pressure tanks of the vehicle. The fuel can be fed from a pressure vessel via a valve to the fuel cell of the vehicle. A pressure vessel may be disposed on the underbody or in the floor assembly of a vehicle.

Situations may arise, for example as a result of an accident, in which one or more pressure vessels of a vehicle are to be transferred to a safe state. The present document deals with the technical task of providing a pressure vessel system for a vehicle which enables the one or more pressure vessels of the pressure vessel system to be reliably and efficiently transferred to a safe state.

The object is achieved by the independent claim(s). Advantageous embodiments are described, among other things, in the dependent claims. It should be noted that additional features of a claim dependent on an independent claim, without the features of the independent claim or only in combination with a subset of the features of the independent claim, can form a separate invention that is independent of the combination of all the features of the independent claim, the subject of an independent claim, a divisional application or a subsequent application. This applies in the same way to technical teachings described in the description, which may form an invention that is independent of the features of the independent claim(s).

According to one aspect, a pressure vessel system for a vehicle (especially for a road vehicle) is described. The pressure vessel system comprises a pressure vessel for receiving a fuel (in particular for receiving hydrogen). In addition, the pressure vessel system includes a fuel line that is set up to transfer fuel from the pressure vessel to a fuel consumer (in particular a fuel cell or a fuel cell stack). The pressure vessel system may include several pressure vessels, each of which is set up to store fuel for the fuel consumer. The fuel may have a pressure in a pressure vessel compared to the atmospheric pressure of 350 bar, 700 bar or more.

The pressure vessel system also comprises at least one blocking unit (in particular a valve) which is set up to prevent the passage of fuel from the pressure vessel into the fuel line in a rest state. Typically, the pressure vessel system includes at least one blocking unit for each pressure vessel of the pressure vessel system.

In addition, the pressure vessel system comprises at least one control unit for the blocking unit, which is set up to transfer the blocking unit from the rest state to an active state under the action of electrical energy, wherein in the active state fuel can pass from the pressure vessel into the fuel line. The blocking unit can therefore be closed in a deenergized state. Furthermore, the blocking unit can be opened by an electric current. For example, an electric current can be used to cause an electromagnet in the control unit to generate a magnetic field to open the blocking unit. By using a blocking unit that is closed in the rest state (i.e., when no electrical energy is provided) and which can only be opened by actively providing an electrical current, reliable closure of the pressure vessels of the pressure vessel system is ensured.

The pressure vessel system typically includes an electrically conductive connection to an onboard electrical network of the vehicle, through which electrical energy can be provided for controlling the blocking unit. The control unit of a blocking unit can be connected directly or via the electrically conductive connection (for example via an internal vehicle plug-in connection) to the onboard network of the vehicle and/or to an internal vehicle control unit. Thus, the blocking unit of a pressure vessel can be reliably controlled (i.e., opened if necessary) during the operation of a vehicle (for example for driving the vehicle).

In addition, the pressure vessel system comprises an access interface unit through which electrical energy (in particular an electrical current) can be supplied by an external power supply to control the blocking unit if no electrical energy is available from the vehicle's onboard network. The access interface unit can thus provide electrical energy independently of the vehicle's electrical power supply to open the blocking unit of a pressure vessel. This allows the pressure vessel to be opened independently of the vehicle's onboard network to carry fuel into the fuel line and further out of the pressure vessel system. This allows reliable and efficient relief of the pressure vessel system (for example by emergency workers after an accident of the vehicle). In particular, the one or more pressure vessels of the pressure vessel system can be transferred to a safe state in a reliable and efficient manner.

The access interface unit can be embodied to form a plug-in connection with an external interface unit to provide electrical energy from the external power supply. The external interface unit can be part of a discharge unit, wherein the discharge unit comprises the external energy supply, which can be coupled via the external interface unit to the access interface unit and thus to the control unit of the blocking unit. For example, the access interface unit may be formed as a socket into which an external interface unit embodied as a plug can be inserted. The plug-in connection can then be used to provide electrical energy for opening the blocking unit of a pressure vessel in a reliable and efficient manner.

The access interface unit may be disposed at a location of the pressure vessel system and/or the vehicle that is easily accessible to a user. For example, the access interface unit may be disposed on the body of the vehicle in which the pressure vessel system is installed. This enables a convenient supply of electrical energy to the control unit of the blocking unit of a pressure vessel.

The access interface unit can include or comprise encoding. The encoding can be specific to pressure vessel systems. In particular, the access interface unit may be standardized specifically for pressure vessel systems. The encoding can be implemented, for example, by one or more grooves and/or cones. By using a specially encoded access interface unit, which can only form a connection with a correspondingly encoded external interface unit, it can be ensured that the blocking unit of a pressure vessel cannot be supplied with energy by an external unit and thus opened in an unacceptable way.

The electrically conductive connection may include a junction and/or a switch which is designed to connect the control unit electrically to the vehicle's onboard network (for example via an internal interface unit) and to the access interface unit. In this way, a vehicle can be provided with an external energy supply in a reliable manner if necessary (for example as a result of an accident or during maintenance).

The pressure vessel system may include a switching element that is set up to connect the access interface unit electrically conductively to the control unit or to separate it from the control unit. In particular, an electrically conductive connection between the access interface unit and the control unit can be closed or interrupted by the switching element. The switching element can include, for example, a relay and/or a semiconductor switching element (for example a MOSFET or an IGBT).

The switching element may be designed to separate the access interface unit from the control unit in a standard operating state. During normal operation of the pressure vessel system and/or the vehicle, the access interface element may thus be decoupled from the control unit of the blocking unit. In this way, an inadmissible energization of the drive unit from an external energy supply can be reliably avoided.

On the other hand, the switching element may be embodied to connect the access interface unit electrically conductively to the control unit in response to a trigger signal, in particular in response to an accident signal. The trigger signal can be sent, for example, from a control unit of the vehicle in which the pressure vessel system is installed. By closing the switching element, it can be ensured that an external energy supply can be provided for opening the blocking unit of a pressure vessel if necessary.

The pressure vessel system may include a relief valve designed to carry fuel from the fuel line into an environment of the pressure vessel system, in particular into an environment of the vehicle.

The relief valve may include a valve that is closed in a rest state, so that no fuel from the fuel line can pass into the environment. On the other hand, the relief valve can be opened to allow fuel into the environment.

In addition, the pressure vessel system may include a coupling element to which an external discharge channel for discharging fuel from the fuel line can be connected. The discharge channel can include, for example, a pipe or a hose through which fuel can be passed. The discharge channel can be used to release the fuel into the atmosphere only at a certain distance from the pressure vessel system or from the vehicle. The discharge channel can be attached, for example, via a complementary coupling element to the coupling element of the pressure vessel system, so that a gas-conducting connection between the fuel line and the discharge channel is created, which is gas-tight (especially in relation to the fuel).

The relief valve is typically arranged between the fuel line and the coupling element. In addition, the coupling element may be embodied to open the relief valve when an external discharge channel has been connected to the coupling element. For example, the opening of the relief valve can be caused by connecting the complementary coupling element of the discharge channel to the coupling element of the pressure vessel system. The opening of the relief valve can be brought about by a mechanical or electrical connection between the coupling element and the discharge valve.

The pressure vessel system may include a pressure converter that is set up to reduce the pressure of fuel in the fuel line between the pressure vessel and the fuel consumer (for example from more than 300 bar to less than 20 bar). The relief valve and the coupling element may be disposed on a section of the fuel line between the pressure converter and the fuel consumer (i.e., in a low pressure region of the pressure vessel system). This makes it possible to discharge the fuel efficiently.

Alternatively, the relief valve and the coupling element may be disposed on a section of the fuel line between the pressure vessel and the pressure converter (i.e., in a low pressure region of the pressure vessel system). This allows the fuel to be discharged quickly.

If necessary, the pressure vessel system may comprise a respective coupling element in the high-pressure region and in the low-pressure region, in order to enable an efficient or rapid discharge of fuel as required.

The coupling element (for discharging fuel) and the access interface unit (for controlling the blocking unit of a pressure vessel) can be arranged in the immediate vicinity of each other. For example, a discharge interface that is easily accessible to a user can be provided on a vehicle on which both the coupling element and the access interface unit are disposed. This enables convenient defueling of a pressure vessel of a pressure vessel system.

In accordance with a further aspect, a vehicle, in particular a road motor vehicle, for example a passenger car, a lorry or a bus, is described, which includes the pressure vessel system described in this document.

In accordance with a further aspect, a discharge unit for a pressure vessel system is described. The pressure vessel system may be embodied as described in this document. The discharge unit comprises an (external) interface unit (i.e., external in relation to the pressure vessel system) which is embodied to be connected to the access interface unit of the pressure vessel system. In particular, the (external) interface unit of the discharge unit can form an electrically conductive plug connection with the access interface unit of the pressure vessel system.

In addition, the pressure vessel system includes an (external) power supply (for example a 12V or 48V power supply) which is set up to provide electrical energy for the control unit of the pressure vessel system via the external interface unit in order to transfer the blocking unit of the pressure vessel of the pressure vessel system from the rest state to the active state.

In addition, the discharge unit can include a control unit that is set up to generate a control signal and provide the signal to the external interface unit to cause the control unit to transfer the blocking unit to the active state. In this case, the control unit can be set up to modulate a current for the control unit, in particular by means of pulse width modulation, in order to generate the control signal. By modulating the current to open the blocking unit, an overload of the control unit (for example an overload of an electromagnet) can also be avoided.

By providing a discharge unit that is external to the pressure vessel system or external to a vehicle in which the pressure vessel system is installed, efficient and reliable defueling of a pressure vessel of the pressure vessel system can be achieved.

It should be noted that the procedures, devices and systems described in this document can be used both alone and in combination with other procedures, devices and systems described in this document. Furthermore, any aspect of the procedures, devices and systems described in this document can be combined in many ways. In particular, the features of the claims can be combined in many ways.

Other objects, advantages and novel features of the present invention will become apparent from the following detailed description of one or more preferred embodiments when considered in conjunction with the accompanying drawings.

DETAILED DESCRIPTION OF THE DRAWINGS

As explained at the beginning, this document deals with a pressure vessel system (in particular a compressed hydrogen storage system (=CHS system)) for a motor vehicle. The pressure vessel system is used to store gaseous fuel under ambient conditions. The pressure vessel system can be used, for example, in a motor vehicle powered by compressed natural gas (CNG) or liquefied natural gas (LNG) or hydrogen.

Such a pressure vessel system includes at least one pressure vessel or pressure tank. The pressure vessel can be, for example, a cryogenic pressure vessel (=CcH2) or a high-pressure gas vessel (=CGH2).

High-pressure gas vessels are embodied to store fuel, essentially at ambient temperatures, permanently at a nominal operating pressure (also called the nominal working pressure or NWP) of approx. 350 bar gauge (=overpressure compared to the atmospheric pressure), further preferably of about 700 bar gauge or more. A cryogenic pressure vessel is capable of storing the fuel at the above-mentioned operating pressures even at temperatures well below the operating temperature of the motor vehicle.

Figure 1:
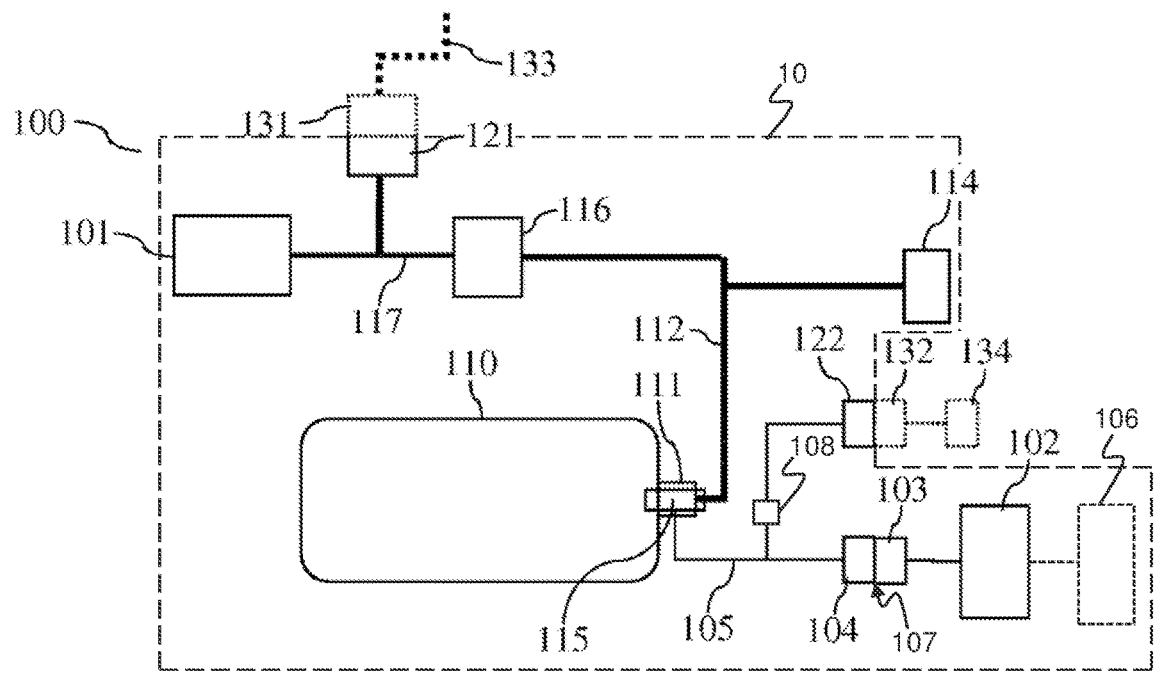
FIGS. 1 and 2 show an example of a pressure vessel system for a vehicle.

FIG. 1 shows an example of a pressure vessel system 100 with a pressure tank or pressure vessel 110, which can be used to provide fuel (in particular hydrogen) for a fuel consumer (for example a fuel cell) 101 of a vehicle 10. The pressure vessel 110 is connected to the fuel consumer 101 via a fuel line 112, 117.

The pressure vessel 110 may comprise end pieces 111 on the end faces, which can be used for holding the pressure vessel 110 during the manufacture of the pressure vessel 110. Furthermore, an opening can be provided on an end piece 111 through which fuel from the pressure vessel 110 can be fed out (for example via a valve 115 to the line 112). A pressure relief device (not shown) may also be arranged at an opening of the pressure vessel 110 that can trigger in the presence of a certain trigger condition (for example in the presence of a certain temperature) to discharge fuel from the pressure vessel 110 into the environment of the pressure vessel 110, thus reducing the pressure in the pressure vessel 110.

The one or more valves 115 (commonly referred to as blocking units) of a pressure vessel 110 are typically closed in a rest state, so that no fuel can pass out from the pressure vessel 110 via one or more valves 115. A valve 115 of a pressure vessel 110 can be connected via one or more electrical lines 105 to a control unit 102, wherein the control unit 102 is set up to connect the valve 115 to a current and/or voltage source 106 (for example to a 12V onboard network of a vehicle) to transfer the valve 115 from the closed rest state to an open active state. The valve 115 can remain in the open active state as long as the valve 115 is coupled to the current and/or voltage source. On the other hand, the valve 115 can automatically return to rest as soon as the valve 115 is decoupled from the current and/or voltage source. The control unit 102 can be coupled to the valve 115 via an (internal) plug-in connection 103, 104 with interface units 103, 104 (for example with a plug and a socket).

The pressure vessel 110 can be refueled with fuel via a refueling access 114 (for example via a tank nipple). In particular, fuel from a tank column can be conveyed via the fuel line 112 into the pressure tank 110 via the refueling access 114. In this case there is typically a non-return valve 201 (see FIG. 2) between the refueling access 114 and the fuel line 112, which prevents a return of fuel from the pressure tank 110 to the refueling access 114.

A fuel cell 101 is typically operated with a relatively low pressure (for example in the region of 10-20 bar), wherein the low pressure for the fuel cell 101 is usually substantially less than the high pressure (for example in the region of 700 bar) in the fuel line 112 and in the pressure tank 110. Between the pressure tank 110 and the fuel cell 101, therefore, a pressure converter 116 (in particular a pressure regulator) may be arranged, which is set up to transfer fuel from the high-pressure fuel line 112 (which has a relatively high pressure) into a low-pressure fuel line 117 (with a relatively low pressure). The fuel is then fed to the fuel cell 101 via the low-pressure fuel line 117.

Figure 2:
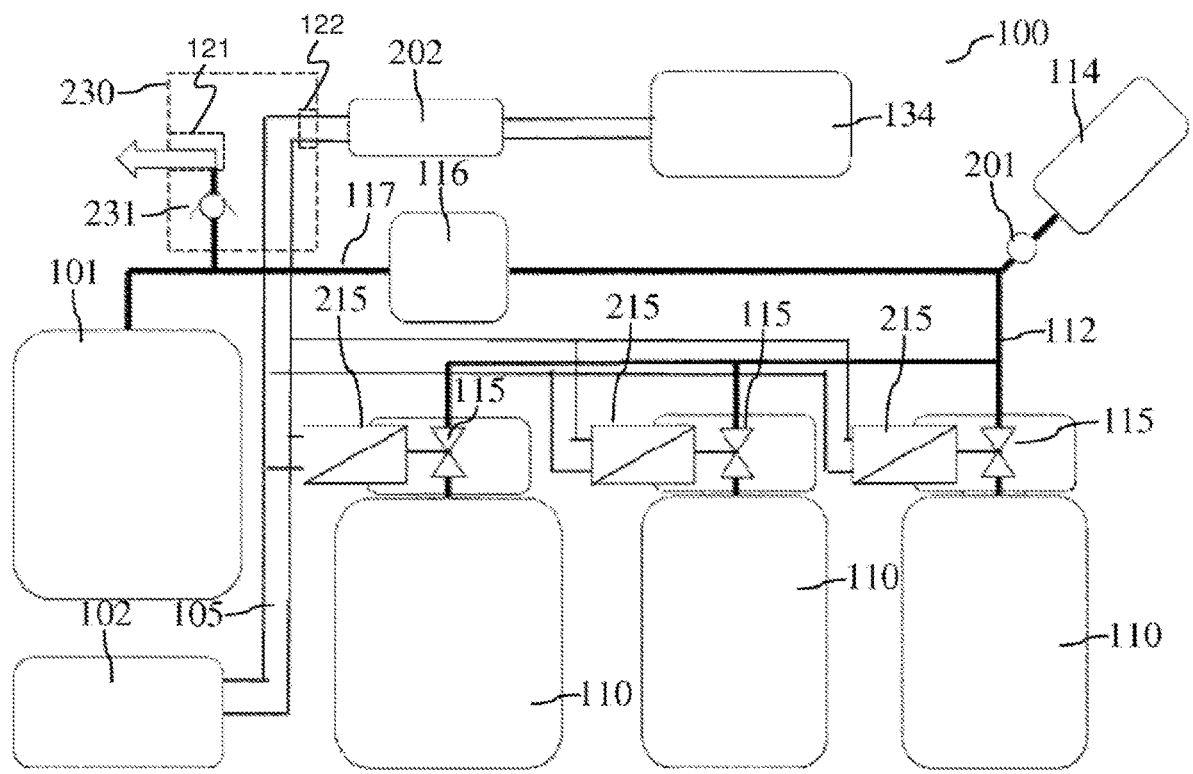
Figure 3:
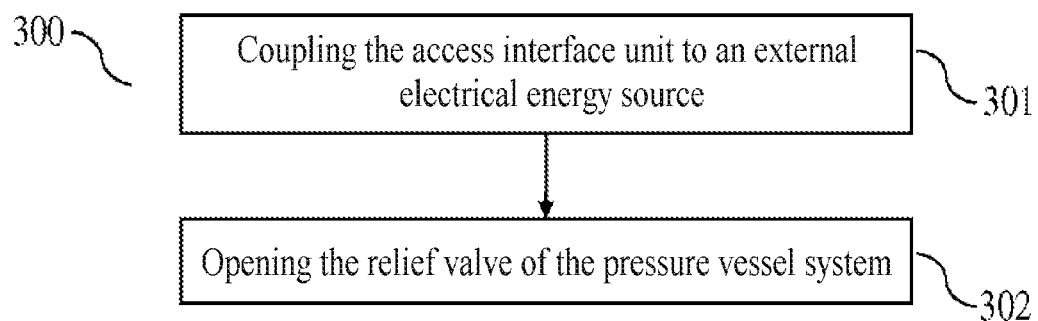
FIG. 3 shows a flow diagram of an example of a method for transferring a pressure vessel into a safe state.

FIG. 2 shows a pressure vessel system 100 for a vehicle with a plurality of pressure vessels 110. Furthermore, FIG. 2 shows control units 215 for the pressure vessel valves 115 of the individual pressure vessels 110. The control units 215 can each include an electromagnet, by means of which a magnetic field for opening a valve 115 can be generated when deenergizing.

A pressure vessel 110 of a pressure vessel system 100 of a vehicle is thus typically connected via one or more valves 115 (in particular via one or more over-temperature valves (OTVs)) to a pressure converter 116. To get fuel from a pressure vessel 110, one or more tank valves 115 must be powered by the vehicle's onboard network and thus opened. A tank valve 115 can typically not be emptied without an onboard power supply (for example after an accident or after a technical defect), as the electrically operated tank shut-off valve 115 cannot be controlled. Thus, in such a situation, emptying or pressure relief of the pressure vessel 110 is not possible.

The one or more valves 115 of a pressure vessel 110 can be electrically conductively coupled via the electrically conductive signal line 105 to an access interface unit 122. The access interface unit 122 can be disposed in a place in a vehicle that is easily accessible to a user (for example for a helper after an accident). The access interface unit 122 can be set up according to the internal interface unit 104 to the control unit 102.

The access interface unit 122 can enable a user to connect a vehicle-external energy supply 134 via a vehicle-external interface unit 132 to the access interface unit 122 and thus to the control unit 215 of a valve 115. The vehicle-external external energy supply 134 can be designed (for example in combination with an external control unit 202) to control the control unit 215 of a valve 115 in order to cause the valve 115 to change from the closed resting state into the opened active state (for example analogous to the valve control unit 102, for example). Thus, even in the event of interruption of the energy supply from an onboard network of a vehicle, a pressure reduction in a pressure vessel 110 can be reliably implemented.

Thus, a device for independent activation of the defueling of a pressure vessel 110 (in particular a CGH2 and/or CCH2 pressure vessel) in a vehicle is described. For this purpose, the one or more control lines 105 between the valve control unit 102 of the vehicle and the one or more blocking units (in particular valves) 115 of the pressure vessel 110 can be led to one or more safely accessible locations of the vehicle (for example next to a high-voltage rescue isolation unit in the interior of the vehicle). External access to the one or more control lines 105 can then be provided via a disconnectable plug-in connection or via a switch with an access plug (i.e., via an access interface unit 122).

The access interface unit 122 can comprise specific encoding 107 (for example corresponding to an internal vehicle interface unit 104 to the valve control unit 102). The encoding 107 can be implemented, for example, by one or more (non-conductive) grooves and/or cones. The encoding 107 ensures a correct connection between the access interface unit 122 and a vehicle-external interface unit 132. Furthermore, the use of impermissible vehicle-external interface units 132 can be avoided.

A vehicle-external, independent device 132, 134 (also referred to in this document as a discharge unit) can be provided, by means of which a power supply corresponding to the onboard power supply (for example a 12V battery) can be provided for external energization of the one or more electrically operated blocking units 115. The vehicle-external device 132, 134 comprises a vehicle-external interface unit 132 (for example a connection plug that may be encoded), which is designed to form a plug-in connection with the access interface unit 122. In addition, the vehicle-external device 132, 134 includes an energy supply 134 and a control unit or modulation unit 202, which produces a control signal corresponding to the onboard control unit 102 (for example a PWM signal) for activating one or more electrical blocking units 115.

The one or more valves 115 of a pressure vessel 110 can thus be energized externally. For this purpose, an external current and/or voltage source can be applied via an access interface unit (for example a plug socket) 122. The connection of one or more valves 115 in this current path between the access interface unit 122 and the one or more valves 115 can be protected against misuse by one or more safety or switching elements 108, such as a contact triggered by a crash signal.

By opening the one or more blocking units 115 of the one or more pressure vessels 110, fuel from the one or more pressure vessels 110 can enter the fuel line 112, 117. The pressure vessel system 100 may comprise a relief valve 231 through which fuel can be discharged from the fuel line 112 into an environment of the pressure vessel system 100, in particular into an environment of the vehicle. In particular, a vehicle-external discharge hose 133 can be connected to the relief valve 231 by means of a coupling 131, 121. By coupling the discharge hose 133, the relief valve 231 can be opened, so that fuel can be discharged from the pressure vessel system 100.

The coupling element 121 of the pressure vessel system 100 (for example a connection of a discharge channel 133) can be arranged in a place of a vehicle that is easily accessible to a user, for example for rescue workers. For example, a discharge interface 230 can be provided on a vehicle on which both the coupling element 121 and the access interface unit 122 are arranged. If necessary, the coupling element 121 and/or the access interface unit 122 can be arranged in immediate proximity to the refueling access.

The relief valve 231 and/or the coupling element 121 can preferably be coupled to the low-pressure fuel line 117 (as shown in FIGS. 1 and 2). In this way, fuel can be discharged in a controlled manner. Alternatively, the relief valve 231 and/or the coupling element 121 can be coupled to the high-pressure fuel line 112, which allows an accelerated discharge of fuel.

A discharge tube or hose 133 (generally a discharge channel) can thus be connected to a central quick-action coupling 121, 131 to discharge fuel from the pressure vessel system 100. The triggering of the relief valve 231 can be carried out by the coupling 121, 131, which opens the relief valve 231 mechanically as a result of the plug-in or which comprises a hydraulic or electrical actuation mechanism for opening the relief valve 231.

Thus, a central discharge device is described, which enables, for example, emergency emptying of a pressure vessel system 100 by rescue workers. By providing an access interface unit 122, a fast, simple and standardizable or standardized emergency discharge of a pressure vessel 110 can be provided as required, without having to rely on the power supply and bus systems of a vehicle. Thus, a pressure vessel 110 (for example after an accident) can be reliably and efficiently transferred to a safe state. Advantageously, standardization of the plug-in device and the control signal for controlling a blocking unit 115 of a pressure vessel 110 can be carried out in order to provide a universal vehicle-external discharge unit 132, 134 for rescue workers and workshops for pressure relief of a pressure vessel 110.

FIG. 2 shows a flow diagram of an example of a method 300 for the relief of a pressure vessel system 100. The method 300 includes coupling 301 the access interface unit 122 of the pressure vessel system 100 to an external energy supply 134. Thus, the one or more blocking units 115 of the one or more pressure vessels 110 of the pressure vessel system 100 can be supplied with electrical energy (even in the case of interruption of the energy supply from the electric power supply of a vehicle) in order to open the one or more blocking units 115 and thereby to release fuel from the one or more pressure vessels 110 into the fuel line 112, 117 of the pressure vessel system 100.

In addition, the method 300 includes opening 302 a relief valve 231 of the fuel line 112, 117 to transfer fuel from the fuel line 112, 117 to an environment of the pressure vessel system 100. The relief valve 231 can be opened, for example, by connecting a discharge channel 133 (for example a hose) via a coupling element 121 to the pressure vessel system 100, in particular to the fuel line 112, 117.

Thus, a device or a system for independent activation of the defueling of a gas pressure vessel 110 (for example CGH2+CCH2) in a vehicle is described (for example if the onboard network of the vehicle is not functioning). In this case, the one or more electrical lines 105 to a blocking unit 115 of the pressure vessel 110 are moved to a safely accessible connection point (i.e., to an access interface unit 122). The connection point can be arranged, for example, next to an HV (high-voltage) rescue isolation point in the interior of the vehicle.

With an external independent discharge unit, a power supply corresponding to the onboard power supply (for example a 12V battery) can be implemented for external energization of the electrically operated blocking unit 115 of the pressure vessel 110. The external power supply 134 can be coupled via a connection plug 132 to the access interface unit 122, wherein the connection plug 132 is encoded according to the access interface unit 122. By means of a control or modulation unit 202, a control signal for activating the blocking unit 115 can be generated according to the onboard control unit 102 (for example by PWM modulation). The fuel can then be fed out of the pressure vessel system 100 via a service port/defueling port 121 of the vehicle.

The present invention is not limited to the exemplary embodiments shown. In particular, it should be noted that the description and the Figures are intended to illustrate only the principle of the proposed methods, devices and systems.

LIST OF REFERENCE CHARACTERS

100 Pressure vessel system
101 Fuel consumer
102 Control unit
103, 104 Interface unit
105 Control line
110 Pressure vessel
111 End piece
112, 117 Fuel line
114 Refueling access
115 Blocking unit (valve)
116 Pressure converter
121, 131 Coupling element
122 Access interface unit
132 System-external interface unit
133 Discharge channel
134 System-external energy supply
201 Non-return valve
202 System-external control unit
215 Control unit
230 Discharge interface
231 Relief valve
300 Method for discharging a pressure vessel system
301, 302 Steps of the method The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure vessel system for a vehicle, comprising:
a pressure vessel configured to receive fuel;
a fuel line configured to transfer fuel from the pressure vessel to a fuel consumer;
a blocking unit configured to transition between a deenergized state, in which the blocking unit is closed and thereby prevents an outflow of fuel from the pressure vessel into the fuel line, and an energized state, in which the blocking unit is open and thereby does not prevent the outflow of fuel;
a control unit configured to control electrical energy to the blocking unit so as to transition the blocking unit between the deenergized state and the energized state, wherein the control unit is configured to receive the electrical energy from an onboard electrical network of the vehicle; and
an access interface unit configured to electrically connect the control unit to an external power supply so as to provide the electrical energy in lieu of and independent from the onboard electrical network.

2. The pressure vessel system according to claim 1, wherein the access interface unit forms a plug-in connection with an external interface unit.

3. The pressure vessel system according to claim 2, wherein the access interface unit includes encoding.

4. The pressure vessel system according to claim 1, further comprising a junction and/or a switch configured to electrically connect the control unit to each of: the onboard electrical network of the vehicle, and the access interface unit.

5. The pressure vessel system according to claim 1 further comprising an internal interface unit through which the electrically conductive connection is connectable to the onboard electrical network of the vehicle.

6. The pressure vessel system according to claim 1 further comprising:
a switching element which connects the access interface unit electrically conductively to the control unit or separates the access interface unit from the control unit;
wherein the switching element separates the access interface unit from the control unit in a standard operating state;
wherein the switching element connects the access interface unit electrically conductively to the control unit in response to a trigger signal.

7. The pressure vessel system according to claim 6, wherein the trigger signal is an accident signal.

8. The pressure vessel system according to claim 1 further comprising:
a relief valve that carries fuel from the fuel line into an environment of the pressure vessel system; and
a coupling element to which an external discharge channel is connectable for discharge of fuel from the fuel line;
wherein the relief valve is disposed between the fuel line and the coupling element; and
wherein the coupling element opens the relief valve when an external discharge channel has been connected to the coupling element.

9. The pressure vessel system according to claim 8 further comprising:
a pressure converter, wherein a pressure of fuel in the fuel line between the pressure vessel and the fuel consumer is reducible by the pressure converter;
wherein the relief valve and the coupling element are disposed on a first section of the fuel line between the pressure converter and the fuel consumer; or
wherein the relief valve and the coupling element are disposed on a second section of the fuel line between the pressure vessel and the pressure converter.

10. A discharge unit in combination with the pressure vessel system according to claim 1, the discharge unit comprising:
an external interface unit that is connected to the access interface unit of the pressure vessel system; and
an external power supply, wherein the external power supply supplies the electrical energy via the external interface unit.

11. The discharge unit in combination with the pressure vessel system according to claim 10, the discharge unit further comprising a control unit configured to generate a control signal and to provide the control signal to the external interface unit in order to cause the control unit of the pressure vessel system to transfer the blocking unit into the active state.

12. The discharge unit in combination with the pressure vessel system according to claim 11, wherein the control unit of the discharge unit is configured to modulate a current for the control unit of the pressure vessel system to generate the control signal.

13. The discharge unit in combination with the pressure vessel system according to claim 12, wherein the control unit of the discharge unit is configured to modulate the current for the control unit of the pressure vessel system by pulse width modulation.

* * * * *